United States Patent
Ramey

(10) Patent No.: US 7,457,847 B2
(45) Date of Patent: Nov. 25, 2008

(54) SERIAL REDIRECTION THROUGH A SERVICE PROCESSOR

(75) Inventor: Brian C. Ramey, Vancouver, WA (US)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 10/040,174

(22) Filed: Jan. 2, 2002

(65) Prior Publication Data
US 2003/0126226 A1 Jul. 3, 2003

(51) Int. Cl.
G06F 15/16 (2006.01)
G06F 15/177 (2006.01)
G06F 15/173 (2006.01)

(52) U.S. Cl. ........................ 709/217; 709/220; 709/223

(58) Field of Classification Search ................. 709/203, 709/217–219, 227, 223, 220; 370/353; 713/2
See application file for complete search history.

(56) References Cited

U.S. PATENT DOCUMENTS

| | | | | |
|---|---|---|---|---|
| 4,189,769 A * | 2/1980 | Cook et al. ..................... 710/1 |
| 4,325,147 A | 4/1982 | Rothlauf ...................... 370/91 |
| 4,833,672 A | 5/1989 | Steely ......................... 370/85 |
| 4,896,289 A * | 1/1990 | Svinicki et al. ............... 714/34 |
| 5,091,938 A * | 2/1992 | Thompson et al. .......... 380/239 |
| 5,251,324 A * | 10/1993 | McMullan, Jr. .............. 725/14 |
| 5,287,461 A | 2/1994 | Moore ........................ 395/275 |
| 5,680,403 A | 10/1997 | Riello et al. ................ 370/532 |
| 5,734,831 A | 3/1998 | Sanders ................. 395/200.53 |
| 5,923,670 A | 7/1999 | Lee et al. ..................... 370/521 |
| 5,935,221 A | 8/1999 | Felmus et al. ................ 710/10 |
| 6,047,319 A * | 4/2000 | Olson ......................... 709/223 |
| 6,119,053 A | 9/2000 | Taylor et al. ................ 700/231 |
| 6,192,423 B1 * | 2/2001 | Graf ............................. 710/31 |
| 6,317,798 B1 * | 11/2001 | Graf ............................. 710/15 |
| 6,498,791 B2 * | 12/2002 | Pickett et al. ............... 370/353 |
| 6,654,816 B1 * | 11/2003 | Zaudtke et al. ................. 710/1 |
| 6,754,767 B2 * | 6/2004 | Gold ........................... 711/114 |
| 6,813,777 B1 * | 11/2004 | Weinberger et al. ........... 725/76 |
| 2003/0097553 A1 * | 5/2003 | Frye, Jr. ......................... 713/2 |

OTHER PUBLICATIONS

"Microsoft Computer Dictionary", Fifth Edition, Microsoft Press, 2002, p. 536.*

(Continued)

Primary Examiner—Saleh Najjar
Assistant Examiner—Farzana Huq
(74) Attorney, Agent, or Firm—Lieberman & Brandsdorfer, LLC

(57) ABSTRACT

A method for remotely communicating with a computer system in a headless environment is provided. The system includes a service processor in communication with a computer through a UART communication channel and in communication with a remote console through a communication connection. The service processor manages communication commands between the computer and the remote console. The service processor transmits data communication received from the remote console to the computer through the UART channel, and the service processor transmits data communication received from the computer to the remote console through the UART channel. In addition, a multiplexer may be employed to direct communication between one of a plurality of computers and the service processor in combination with a multiplexer control to select one of the computers for communication with the service processor. The multiplexer directs the communication through the UART channel.

8 Claims, 4 Drawing Sheets

OTHER PUBLICATIONS

"Windows Platform Design Notes: Building Hardware and Firmware to Complement Microsoft Windows Headless Operation", Feb. 20, 2001, Draft Version 0.45, pp. 1-15.

"Windows Platform Design Notes: Serial Port Console Redirection Table", Feb. 21, 2001, Draft Version 0.80, pp. 1-5.

"Windows Platform Design Notes: Standardizing Out-of-Band Management Console Output and Terminal Emulation (VT-UTF8 and VT100+)", May 22, 2001, Preview Draft Version 0.77, pp. 1-7.

* cited by examiner

SERIAL REDIRECTION THROUGH A SERVICE PROCESSOR

BACKGROUND OF THE INVENTION

1. Technical Field

This invention relates to remote communication with a computer system. More specifically, the invention utilizes conventional hardware components to enable support and maintenance of a computer from a remote location.

2. Description of the Prior Art

Current computer operating systems provide support for operating a computer with a local display or input devices. All input commands are input to the computer from a keyboard, mouse, or other input device directly connected to the computer. FIG. 1 is a prior art block diagram 10 illustrating local control of a computer 20. The computer 20 has input devices 22, 24 and 26 connected directly to the computer 20. The input devices may be in the form of a keyboard, a mouse, a display device, or alternative input tools conventionally associated with communicating with a computer. Accordingly, all administrative functions for management and configuration of the computer are conducted locally and are not available remotely.

Recently, the Microsoft Windows 2000 NT® operating system has developed a driver that enables remote input of administrative functions to a computer for both in-band and out-of-band modes. This type of operating system is often referred to as "headless". A headless operating system requires that local console input/output dependencies be removed from the operating system, i.e. in a headless environment the operating system supports operating without a keyboard, mouse or monitor directly attached to the system. FIG. 2 is a prior art block diagram 40 illustrating connections between a computer 50 and a remote console 60 in an operating system supporting headless communication. The computer 50 uses a serial port 55 to enable remote communication. The serial port 55 is a Universal Asynchronous Receiver Transmitter (UART). A remote console 60 is connected to the computer 50 through the UART 55 of the computer and the UART 65 of the console through a direct connection. Management and configuration commands to the computer may be input from the console in direct communication with the computer. Accordingly, the headless driver developed to support remote communication requires a connection from the computer UART 55 to the remote console UART 55 through a direct connection.

Another form of remote communication and management of a computer is shown in U.S. Pat. No. 6,192,423 to Graf. The '423 patent discloses remote access through a modem communication connection. The system shown in Graf includes a micro-controller with a UART and a motherboard with a UART. A multiplexer selects one of these UARTs to be connected to a serial port connector, which receives communication through a modem. The channel used with the interface to the motherboard is the same channel as the modem channel. Accordingly, the hardware and control logic of Graf does not provide the availability of remotely receiving and transmitting pre-boot and out-of-band data.

There is therefore a need for a method of providing headless communication with a computer for remote management of in-band, out-of-band, and pre-boot modes of operation.

SUMMARY OF THE INVENTION

The invention comprises a method for enabling headless communication with a computer for in-band, out-of-band, and pre-boot maintenance from a remote console. The headless communication enables an operator to manage and configure a computer from a remote console through a standard communication connection.

In a first aspect of the invention, a method for remotely communicating with a computer system operable in a headless environment is provided. Communication from a first partition of the system is routed to a service processor, and communication from the service processor is routed to a remote console. The step of routing communication from the first partition to the service processor preferably utilizes a UART communication channel. The step of routing communication from the service processor to the remote console preferably utilizes an Ethernet connection. A multiplexer may be implemented to route communication from one of a plurality of partitions to the service processor through a UART communication channel. A multiplexer control may be implemented to select one of the partitions for communication between the multiplexer and the service processor. The multiplexer preferably utilizes standard UART signals for communicating with the service processor and the partition.

In a second aspect of the invention, a computer system operable in a headless environment is provided. The system includes a first partition, a service processor to manage a communication between the first partition and a remote console, and a UART communication channel to transfer the communication between the first partition and the service processor. The service processor preferably transmits data communication received from the remote console to the first partition through the UART channel. In addition, the system may include a multiplexer to direct communication between one of a plurality of partitions and the service processor through a UART communication channel. The multiplexer preferably utilizes a multiplexer control to select one of the partitions for communication with the service processor. The service processor preferably receives and transmits commands with the remote console through an Ethernet connection.

In a third aspect of the invention a method for remotely communicating with a computer system operable in a headless environment is provided. Communication is routed from a first partition of the system to a multiplexer, and from a second partition of the system to a multiplexer. Communication from the multiplexer is routed to a remote console. One of the partitions may be selected for communication from the multiplexer to the remote console through a multiplexer control. The step of routing communication from one of the partitions to the multiplexer and from the multiplexer to the remote console preferably utilizes a UART communication channel.

In a fourth aspect of the invention, a computer system operable in a headless environment is provided. The system includes a first partition, a second partition, a multiplexer to manage a communication between one of the partitions and a remote console, and a UART communication channel to transfer the communication between one of the partitions and the remote console. A multiplexer control is preferably utilized to select one of the partitions for communication with the remote console. The partitions preferably communicate with the multiplexer through a UART communication channel, and the multiplexer preferably communicates with the remote console through an Ethernet connection.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

In Microsoft Windows 2000 NT® redirection firmware provides a driver that is capable of outputting the local text display and accepting keyboard input from a UART serial port. A console remote from a computer communicates with the computer through the UART. Each computer has a computer card known as a service processor that is conventionally provided with the computer or may be added to the computer. The service processor may be formatted with a UART serial port within the protocols of the operating system firmware for supporting headless communication. In addition, each service processor is adapted to communicate with an external console through a standard communication connection. Accordingly, the configuration of a UART serial port on the service processor enables the service processor to communicate with both the computer and an external console through independent communication channels.

Multiprocessor systems by definition contain multiple processors, also referred to herein as CPUs, that can execute multiple processes or multiple threads within a single process simultaneously in a manner known as parallel computing. In general, multiprocessor systems execute multiple processes or threads faster than uniprocessor systems that can execute programs sequentially. The architecture of shared memory multiprocessor systems may be classified by how their memory is physically organized. In distributed shared memory (DSM) machines, the memory is divided into modules physically placed near one or more processors, typically on a processor node. Although all of the memory modules are globally accessible, a processor can access local memory on its node faster than remote memory on other nodes. Because the memory access time differs based on memory location, such systems are also called non-uniform memory access (NUMA) machines. The use of NUMA architecture to increase performance is not restricted to NUMA machines. Algorithms that enhance the performance of NUMA machines can be applied to any multiprocessor system that has a subset of processors with lower latencies. These includes not only NUMA and shared-cache machines, but also machines where multiple processors share a set of bus-interface logic, as well as machines with interconnects that "fan out" (typically in hierarchical fashion) to the processors.

Technical Details

Figure 1:
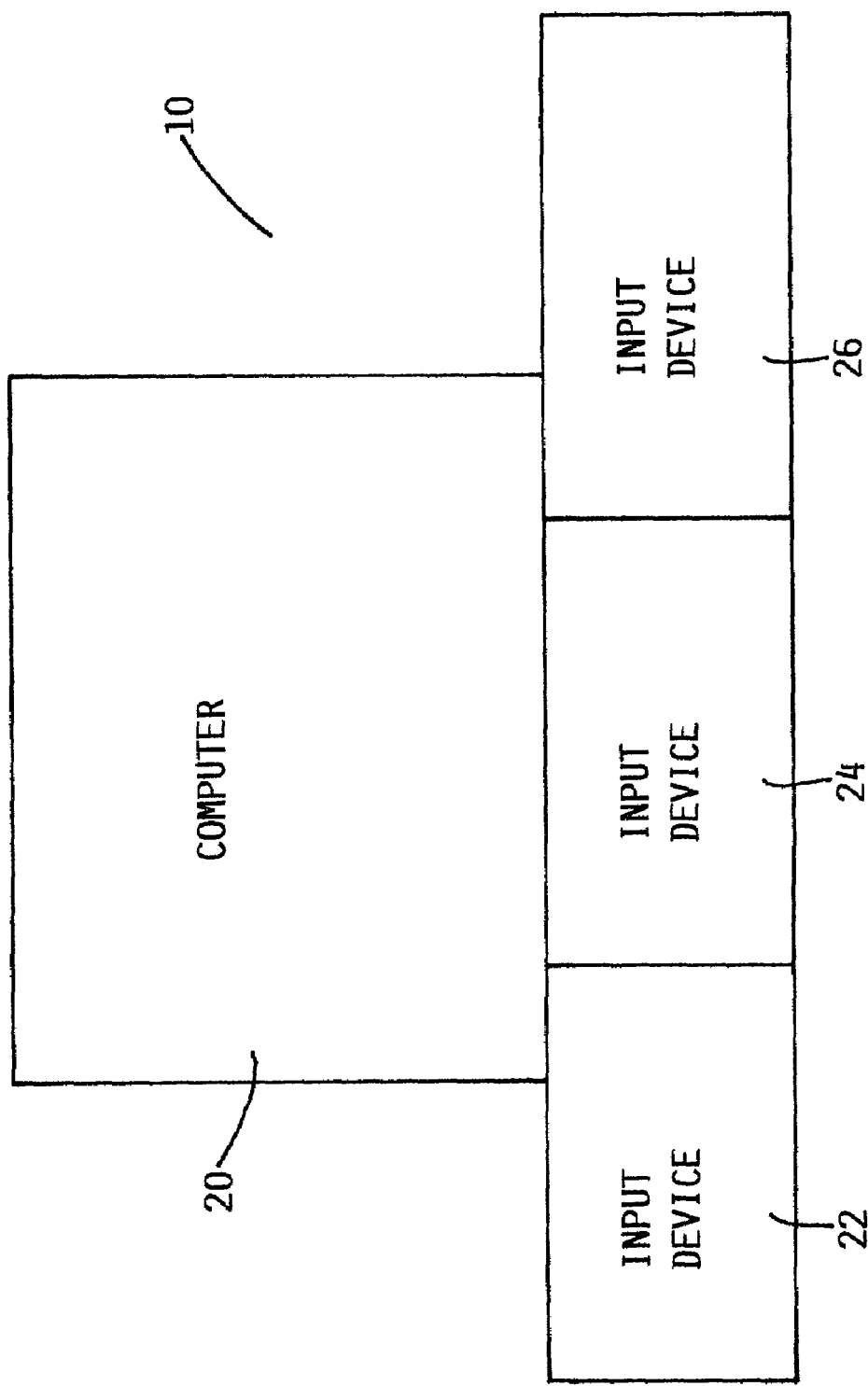
FIG. 1 is a prior art block diagram of a computer without headless support.
Figure 2:
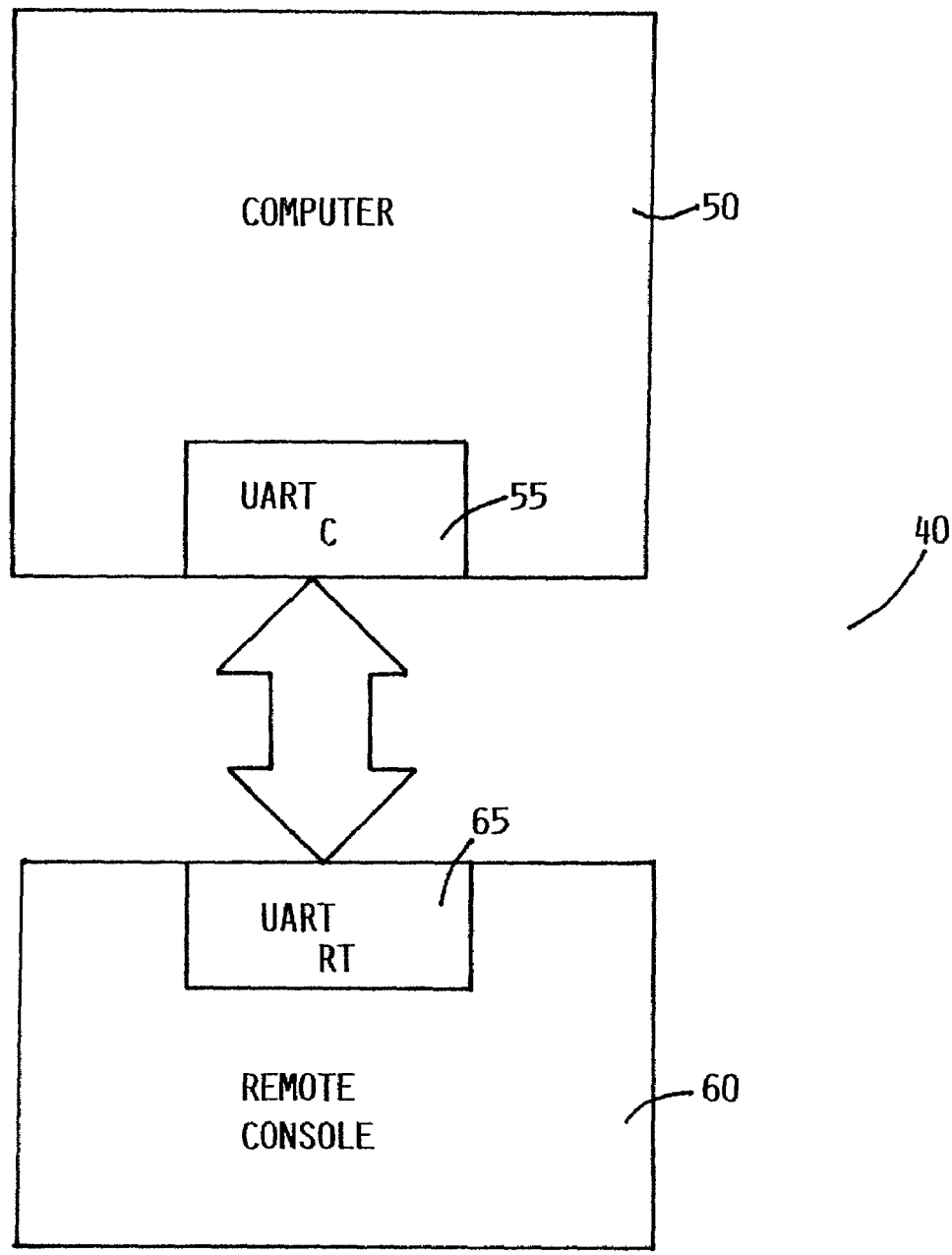
FIG. 2 is a prior art block diagram of a computer with headless support.
Figure 3:
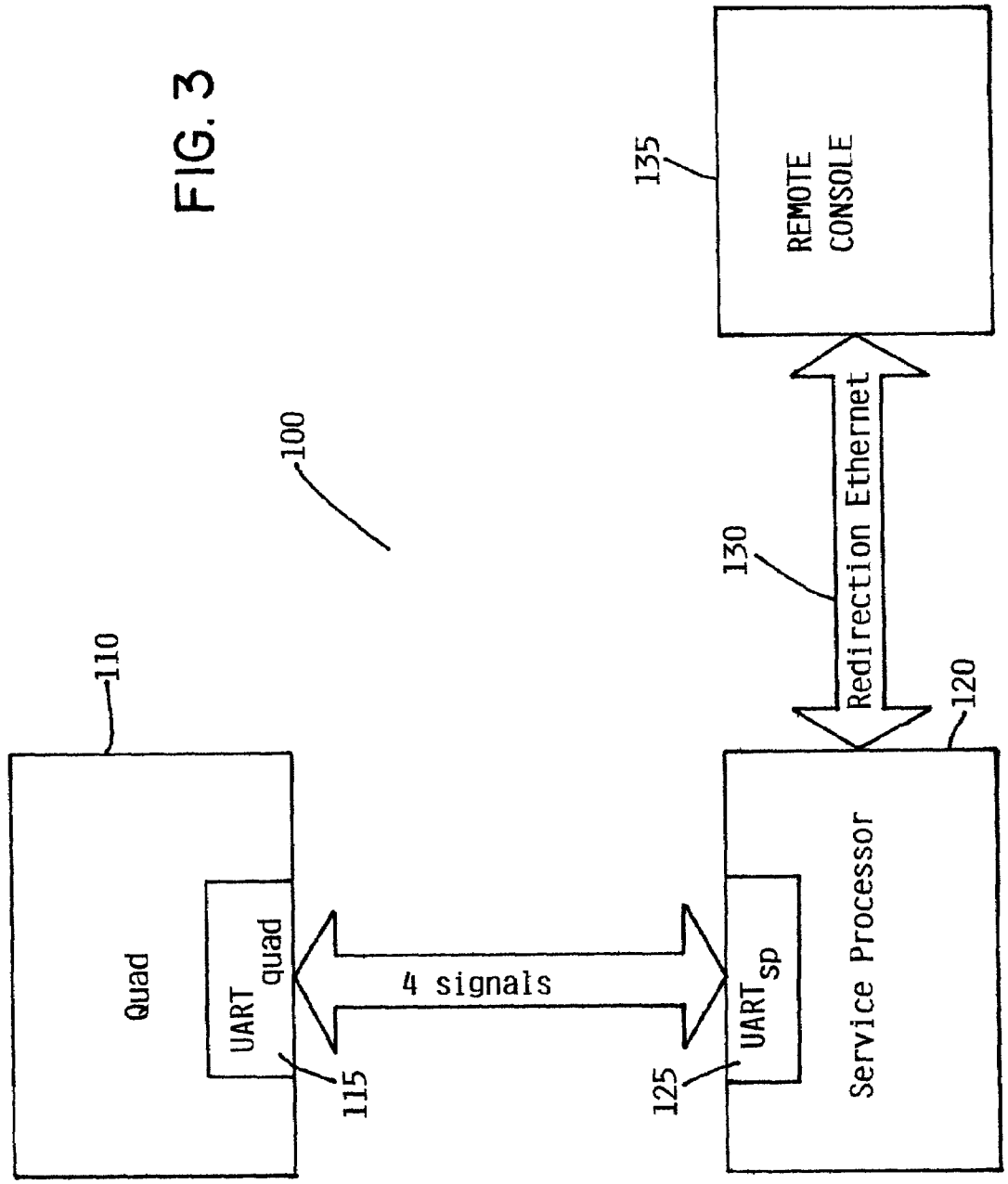
FIG. 3 is a block diagram of a computer with headless support according to the preferred embodiment of this invention, and is suggested for printing on the first page of the issued patent.

FIG. 3 is a block diagram 100 of a single quad system 110 formatted for headless communication support. A quad is a plurality of computational nodes which are joined together by system interconnect hardware to form one or more independent computing environments, such environments being known as partitions. In this illustration, the quad 110 is formatted with an operating system with headless communication firmware. The operating system sets aside a UART communication port 115 in the quad 110 to support communication with a remote console 135. A service processor 120 may be provided or previously existent within the quad 110 and is configured with at least one UART communication channel 125 designated for communication with the UART communication port 115. The UART communication channel 125 in the service processor is configured for supporting headless communication with the quad 110. Accordingly, both the service processor UART 125 and the quad UART 115 are configured for supporting headless communication.

In addition, the service processor 120 has an Ethernet connection 130 which interfaces to the remote console 135. The remote console 135 may provide management commands to the quad 110 through the service processor 120. The service processor is configured to accept commands from a remote console, and may relay such commands to the quad through signals transmitted from the service processor UART communication channel 125 to the quad UART communication port 115. The service processor controls routing and redirection of serial data received through an Ethernet connection. Accordingly, by configuring the service processor 120 with a UART communication channel for headless support, configuration and management of the quad 110 may be conducted from a remote console 135 that connects to the service processor through a standard modem or Ethernet connection, or an alternative communication connection.

Figure 4:
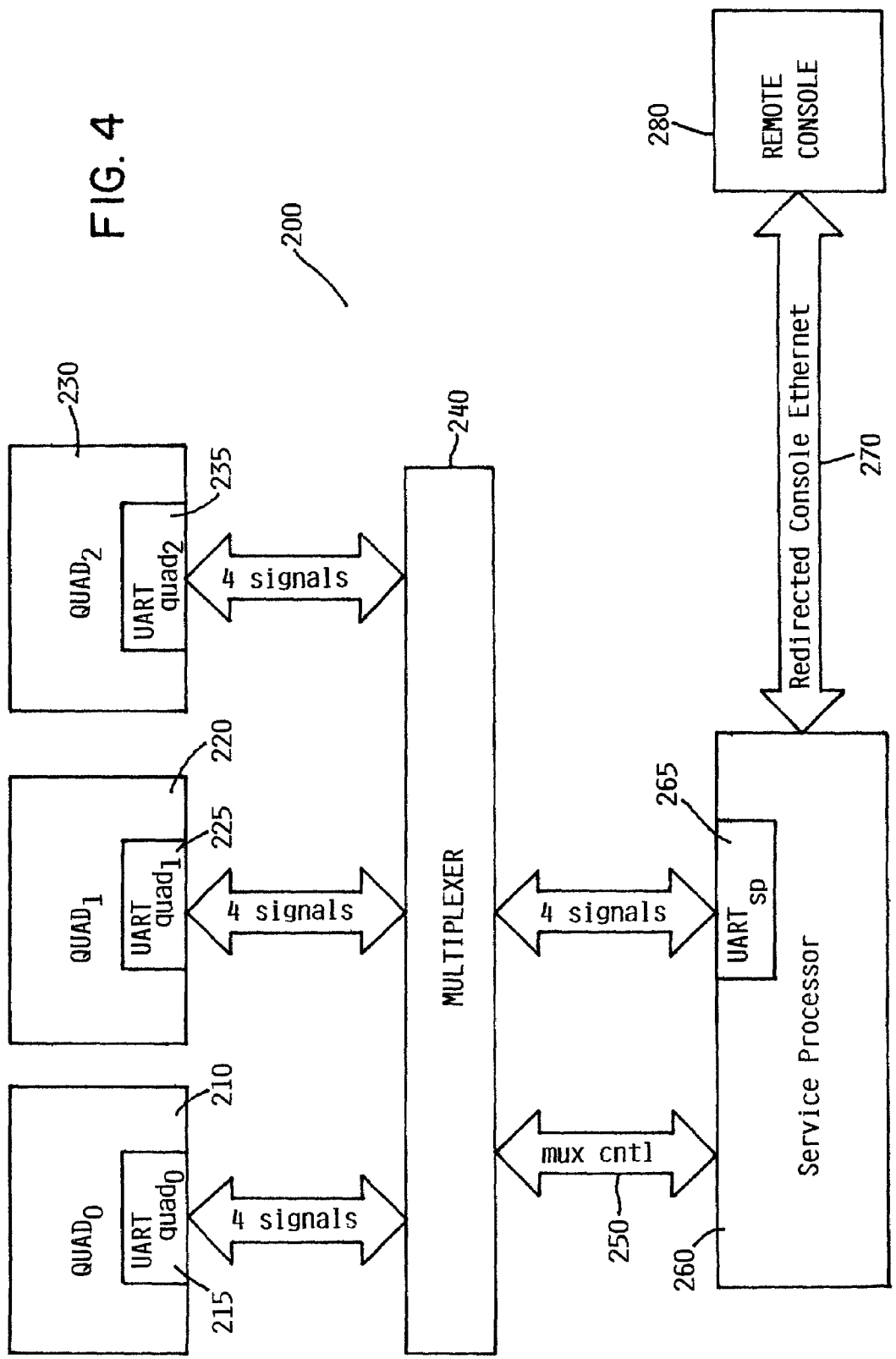
FIG. 4 is a block diagram of a multiprocessor computer system with headless support.

In a further embodiment, the redirection of communication from a computer to a remote console, as illustrated in FIG. 3, may be expanded to a computer system comprised of multiple quads. A quad is a multiple host computer system constructed of a plurality of computational nodes which are joined together by system interconnect hardware to form one or more independent computing environments, such environments being known as partitions. FIG. 4 is a block diagram 200 of a multiple quad system. Each quad is capable of being configured with an operating system with firmware for enabling remote communication. An operating system that supports headless communication requires at least one UART communication port to support transmission and receipt of signals to and from a remote console. As such, each quad 210, 220 and 230 is configured with a UART communication port 215, 225 and 235, respectively, for supporting headless communication. A service processor 260 is provided or previously existent within the system and is configured with at least one UART communication channel 265 designated for headless communication with the quads 210, 220 and 230. As in a single quad system, the service processor 260 has an Ethernet connection 270 which interfaces to a remote console 280. The service processor 260 is configured with a single UART communication channel 265 for supporting headless communication, and therefore the service processor may only communicate with a single quad at any one time. A multiplexer 240 is provided to route headless communication from one of the quads 210, 220 or 230 to the service processor 240. In addition, a multiplexer control 250 is provided to control the selection of a specific UART communication port of a specific quad for communication with the service processor 260. Upon selection of a quad UART communication port through the multiplexer control 250, the remote console 280 may provide management commands to the quad associated with the selected UART communication port through the service processor 260 and the multiplexer 240. The service processor 260 is configured to accept commands from a remote console, and may relay such commands to the selected quad through signals transmitted from the service processor UART communication channel 265 through the multiplexer 240 to a selected quad UART communication port. Each UART communication port and communication channel utilized in the remote management of the system must be formatted for headless communication in compliance with the headless firmware of the operating system. Accordingly, a multiplexer in combination with a multiplexer control may be utilized in a multiple partition system to enable remote configuration and management of a select quad from a remote console through a service processor.

Advantages Over The Prior Art

The process of routing headless communication from a computer, or a computer in a quad, to a service processor enables remote management of the computer and/or the computer in a quad, from a remote console that is not directly connected to the computer through a cable or local area network connection. The service processor communicates with the computer through standard UART serial communication signals. Both the service processor and the standard UART serial communication signals are known technologies. By routing management and configuration commands from the computer through the service processor, remote communication through a UART communication port is supported and standard technologies are implemented to enable unlimited routing of communication with the computer. This enables an operator to configure and manage operation of a computer, or a plurality of host systems, from any remote location that has the capabilities of communicating with the service processor through a standard modem or Ethernet connection, or an alternative compatible connection. Accordingly, the configuration of a headless UART communication channel in the service processor enables remote communication with the computer for management and maintenance of the computer from an infinite number of locations.

Alternative Embodiments

It will be appreciated that, although specific embodiments of the invention have been described herein for purposes of illustration, various modifications may be made without departing from the spirit and scope of the invention. In particular, a multiple partition system may include a plurality of service processors, with each having one UART communication channel formatted for headless communication. Each service processor communicates with a multiplexer and a multiplexer control to enable selection and routing of headless communication with a select partition. A service processor may be in the form of a card or an alternative device mounted in the system. Remote communication with the service processor may be provided through a standard modem, an Ethernet connection, as well as through an Internet Service Provider or alternative communication source. In addition, a multiple partition system may include a multiplexer and multiplexer control for routing and controlling communication with a remote console, respectively. All communications between each of the partitions and the multiplexer are conducted through a UART communication channel, and all communications between the multiplexer and the remote console are conducted through a UART communication channel. In addition, commands to a partition can be provided to the service processor and/or the multiplexer through an Internet Browser or a similar interface. Finally, the scope of the preferred embodiment should not be limited to the Microsoft Windows 2000 NT® operating system. The hardware and associated routing method may be implemented with any operating system that supports headless operation. Accordingly, the scope of protection of this invention is limited only by the following claims and their equivalents.

I claim:

1. A method comprising:
    configuring a computer system with a first partition having at least two computational nodes, with each node configured with a UART channel formatted for headless communication;
    configuring said computer system with a service processor in communication with said first partition, said service processor providing support and maintenance of said computer system and said service processor having one UART channel in communication with said first partition and formatted for headless communication;
    routing communication between said UART channels of said nodes of said first partition and said UART channel of said service processor, including routing output of said headless UART channels of said computational nodes into said one UART channel of said service processor; and
    routing communication between said service processor and a remote console, including communicating management commands to at least one of said nodes in said first partition, through said one UART channel in said service processor from said remote console.

2. The method of claim 1, further comprising providing management commands to said partition through said service processor.

3. The method of claim 2, wherein said management commands support in-band, out-of-band, and pre-boot modes of operation.

4. The method of claim 1, further comprising the step of routing communication from one of a plurality of partitions to said service processor through a multiplexer.

5. The method of claim 4, further comprising the step of selecting a specific channel of one of said plurality of partitions for communication between said multiplexer and said service processor through a multiplexer control.

6. The method of claim 4, further comprising said remote console providing a management command to one of said plurality of partitions through said service processor and said multiplexer.

7. A method for remotely communicating with a computer system, comprising:
    configuring a computer system with a first partition having at least two computational nodes and a second partition having at least two computational nodes, with each node configured with a UART channel formatted for headless communication;
    configuring said computer system with a service processor in communication with said first and second partitions through a multiplexer, said service processor having a channel formatted for headless communication, wherein said service processor provides management commands to said partitions;

routing communication between said UART channels of said nodes of said first and second partitions and said UART channel of said service processor through said multiplexer, including routing output of said headless UART channels of said computational nodes into said one UART channel of said service processor; and routing communication between said service processor and a remote console, including management commands to at least one of said nodes in said first and second partitions through said one UART channel in said service processor from said remote console.

8. The method of claim 7, further comprising the step of selecting one of said partitions for communication from said multiplexer to said remote console through a multiplexer control.

* * * * *